United States Patent
Tanaka et al.

(10) Patent No.: US 9,283,948 B2
(45) Date of Patent: Mar. 15, 2016

(54) VEHICLE AND CONTROL METHOD FOR VEHICLE

(71) Applicants: Nobuyuki Tanaka, Toyota (JP); Shoji Nagata, Anjo (JP)

(72) Inventors: Nobuyuki Tanaka, Toyota (JP); Shoji Nagata, Anjo (JP)

(73) Assignees: TOYOTA JIDOSHA KABUSHIKI KAISHA, Toyota-Shi (JP); AISIN AW CO., LTD., Anjo-Shi (JP)

( * ) Notice: Subject to any disclaimer, the term of this patent is extended or adjusted under 35 U.S.C. 154(b) by 0 days.

(21) Appl. No.: 14/360,152

(22) PCT Filed: Nov. 23, 2012

(86) PCT No.: PCT/IB2012/002455
§ 371 (c)(1),
(2) Date: May 22, 2014

(87) PCT Pub. No.: WO2013/076566
PCT Pub. Date: May 30, 2013

(65) Prior Publication Data
US 2014/0309831 A1    Oct. 16, 2014

(30) Foreign Application Priority Data

Nov. 24, 2011 (JP) ................................ 2011-256254

(51) Int. Cl.
*B60W 10/06* (2006.01)
*B60W 10/08* (2006.01)
*B60K 6/34* (2007.10)
*B60W 20/00* (2006.01)

(52) U.S. Cl.
CPC ............... *B60W 10/08* (2013.01); *B60K 6/34* (2013.01); *B60W 20/50* (2013.01); *B60W 2540/106* (2013.01); *B60W 2710/083* (2013.01); *B60W 2710/1055* (2013.01); *Y02T 10/7258* (2013.01)

(58) Field of Classification Search
USPC .............................. 180/50–200; 701/20–100
See application file for complete search history.

(56) References Cited

U.S. PATENT DOCUMENTS 5,808,428 A * 9/1998 Ito .................... B60L 11/1803
                                                      318/139
7,713,163 B2 * 5/2010 Hayashi ................. B60K 6/445
                                                      477/3

(Continued)

FOREIGN PATENT DOCUMENTS

JP    2007-137373 A    6/2007
JP    2007-196733 A    8/2007

(Continued)

*Primary Examiner* — Rami Khatib
*Assistant Examiner* — Timothy Nesley
(74) *Attorney, Agent, or Firm* — Kenyon & Kenyon LLP

(57) ABSTRACT

In a vehicle that includes an engine, a motor, a generator, a battery electrically connected to the motor and the generator, and a transmission provided between the motor and an output shaft coupled to a drive wheel, an ECU executes "battery-less travel control" in which, at the time of a failure of the battery, the battery is isolated from the motor and the generator, the generator is caused to generate electric power by generating a torque, corresponding to an accelerator pedal operation amount, from the generator, and the vehicle is caused to travel by driving the motor using the electric power generated by the generator. The ECU suppresses losing a balance of input and output electric powers between the generator and the motor by filtering the accelerator pedal operation amount when a vehicle speed exceeds a limit vehicle speed during the battery-less travel control.

9 Claims, 10 Drawing Sheets

(56) References Cited

U.S. PATENT DOCUMENTS

| | | | | |
|---|---|---|---|---|
| 7,828,093 B2* | 11/2010 | Hanada | | B60K 6/365 180/415 |
| 7,828,692 B2* | 11/2010 | Hayashi | | B60K 6/445 477/111 |
| 8,688,300 B2* | 4/2014 | Takahashi | | B60K 6/365 477/4 |
| 8,909,397 B2* | 12/2014 | Aridome | | B60K 6/405 180/65.1 |
| 2001/0048226 A1 | 12/2001 | Nada | | |
| 2009/0159350 A1 | 6/2009 | Hanada et al. | | |
| 2010/0070123 A1* | 3/2010 | Itoh | | B60K 6/445 701/22 |
| 2010/0116235 A1* | 5/2010 | Imamura | | B60W 10/30 123/179.3 |
| 2010/0121512 A1 | 5/2010 | Takahashi | | |
| 2014/0288744 A1* | 9/2014 | Endo | | B60W 10/06 701/22 |
| 2014/0288756 A1* | 9/2014 | Tanaka | | B60K 6/34 701/22 |

FOREIGN PATENT DOCUMENTS

| | | |
|---|---|---|
| JP | 2008-072868 A | 3/2008 |
| JP | 2009-045946 A | 3/2009 |
| JP | 2010148330 A | 7/2010 |
| JP | 2010200582 A | 9/2010 |

* cited by examiner

FIG. 4

| CONTROL METHOD | SINUSOIDAL PWM | OVERMODULATION PWM | RECTANGULAR WAVE (ONE PULSE) |
|---|---|---|---|
| | PWM CONTROL MODE | | RECTANGULAR CONTROL MODE |
| OUTPUT VOLTAGE WAVEFORM OF INVERTER | FUNDAMENTAL COMPONENT | FUNDAMENTAL COMPONENT | FUNDAMENTAL COMPONENT |
| MODULATION FACTOR | 0 TO ABOUT 0.61 | MAXIMUM VALUE IN SINUSOIDAL PWM TO 0.78 | 0.78 |
| FEATURE | SMALL TORQUE FLUCTUATION | IMPROVED OUTPUT IN INTERMEDIATE-SPEED RANGE | IMPROVED OUTPUT IN HIGH-SPEED RANGE |

FIG. 5

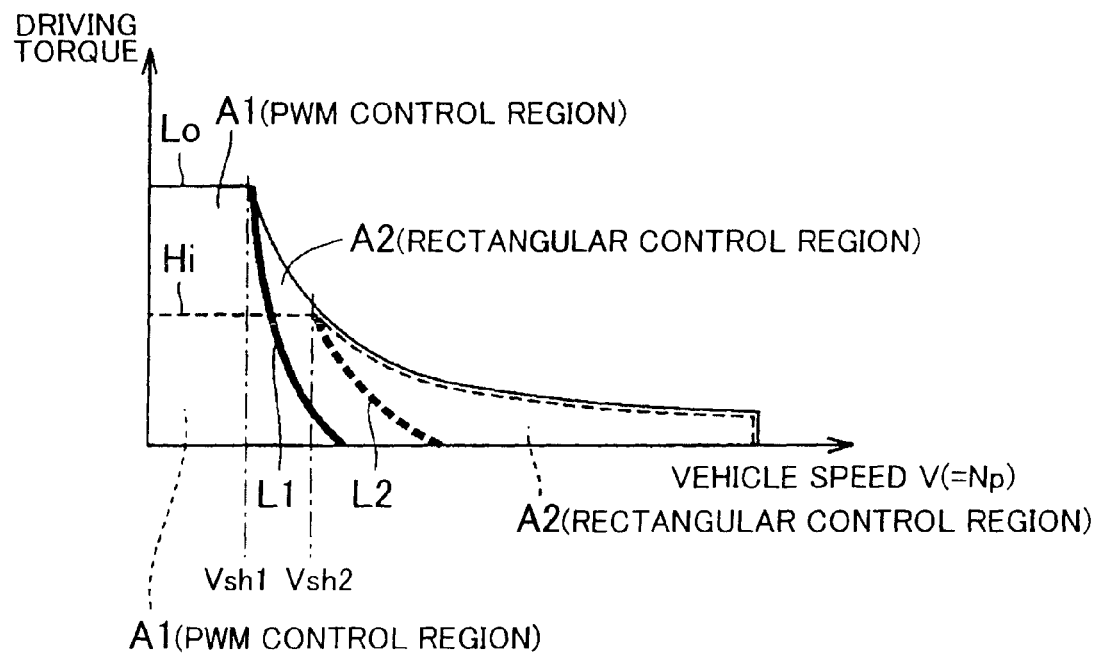

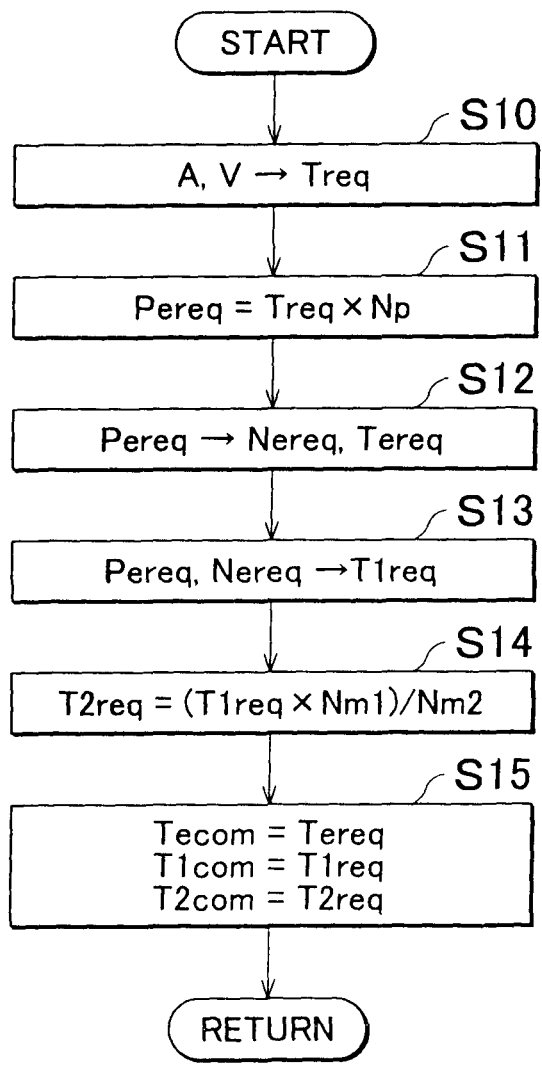

VEHICLE AND CONTROL METHOD FOR VEHICLE

CROSS-REFERENCE TO RELATED APPLICATIONS

This is a national phase application based on the PCT International Patent Application No. PCT/IB2012/002455 filed on Nov. 23, 2012, claiming priority to Japanese application No. 2011-256254 filed Nov. 24, 2011, the entire contents of both of which are incorporated herein by reference.

BACKGROUND OF THE INVENTION

1. Field of the Invention

The invention relates to a vehicle and a control method for the vehicle and, more particularly, to a vehicle that travels by using power of at least any one of an engine and a motor and a control method for the vehicle.

2. Description of Related Art

In recent years, a hybrid vehicle that travels by using power of at least any one of an engine and a motor is in widespread use. Some hybrid vehicles include a generator in addition to the motor. The generator generates electric power by using the power of the engine.

Japanese Patent Application Publication No. 2007-196733 (JP 2007-196733 A) describes a technique for, in a hybrid vehicle that includes an engine, a motor and a generator, executing control (hereinafter, also referred to as "battery-less travel control") in which, at the time of a failure of a battery that stores electric power for driving the motor, the battery is isolated from an electrical system that includes the motor and the generator and then the motor is driven by using electric power generated by the generator with the use of the power of the engine. In addition, Japanese Patent Application Publication No. 2008-72868 (JP 2008-72868 A), Japanese Patent Application Publication No. 2007-137373 (JP 2007-137373 A) and Japanese Patent Application Publication No. 2009-45946 (JP 2009-45946 A) also describe related arts.

Incidentally, an inverter for driving the motor is mounted on a hybrid vehicle. Major control methods for the inverter include a pulse width modulation (hereinafter, also referred to as "PWM") control method and a rectangular wave voltage control (hereinafter, also simply referred to as "rectangular control") method. Rectangular control has a larger modulation factor (value corresponding to the percentage of an output voltage to an input voltage) of voltage conversion than PWM control and is able to increase a motor output, while it has a poor control accuracy (control response) and, therefore, an inverter output voltage tends to be unstable. Therefore, generally, rectangular control is used only in a high vehicle speed range, and PWM control is usually used.

On the other hand, during battery-less travel control, the battery cannot be used as an electric power buffer, and it is required to accurately keep the balance of input and output electric powers between the motor and the generator. However, when a vehicle speed falls in a high vehicle speed range during battery-less travel control, the control method for the inverter shifts from PWM control to rectangular control having poor control accuracy. By so doing, the balance of input and output electric powers is lost at the time when a steep change in required driving force has occurred, and a voltage (inverter output voltage) applied to the motor may be unstable.

SUMMARY OF THE INVENTION

The invention provides a vehicle and its control method that suppresses application of an unstable voltage to a motor during battery-less travel control.

A first aspect of the invention provides a vehicle that travels by rotating an output shaft coupled to a drive wheel using power of at least one of an engine and a motor. The vehicle includes: a generator that generates electric power using power of the engine; a battery that is configured to be connectable to the motor and the generator; and a controller. The controller is configured to drive the motor in pulse width modulation control when a vehicle speed is lower than a threshold, and is configured to drive the motor in rectangular control that has an improved output but poor controllability as compared with the pulse width modulation control when the vehicle speed exceeds the threshold. At the time of an abnormality of the battery, the controller is configured to execute battery-less travel control in which the battery is isolated from the motor and the generator, the generator is caused to generate electric power by generating a torque, corresponding to at least any one of an accelerator operation amount and a vehicle required torque, from the generator, and the motor is driven by using the electric power generated by the generator. At the time of executing the battery-less travel control, when the vehicle speed exceeds a limit value corresponding to the threshold, the controller is configured to execute at least one of a first process of limiting a rate of variation in the accelerator operation amount, a second process of limiting a rate of variation in the vehicle required torque and a third process of limiting a torque of the generator to thereby suppress losing a balance of input and output electric powers between the generator and the motor.

In addition, in the vehicle, in the first process, the rate of variation in the accelerator operation amount may be limited by gently varying the accelerator operation amount through filtering.

In addition, in the vehicle, in the second process, the rate of variation in the vehicle required torque may be limited by gently varying the vehicle required torque through filtering.

In addition, in the vehicle, in the third process, the torque of the generator may be limited such that the torque of the generator is not decreased to below a predetermined torque through a guard process.

In addition, the vehicle may further include a transmission that is provided between the motor and the output shaft, and the controller may be configured to change the limit value on the basis of a speed ratio of the transmission.

In addition, in the vehicle, the transmission may establish any one of a low-speed gear and a high-speed gear that is smaller in speed ratio than the low-speed gear, and the controller may be configured to increase the threshold and the limit value when the high-speed gear is established as compared with when the low-speed gear is established. Furthermore, the controller may be configured to, at the time of executing the battery-less travel control, shift into the high-speed gear when the low-speed gear is established.

In addition, the vehicle may further include a planetary gear unit that includes: a ring gear coupled to the motor; a sun gear coupled to the generator; pinions engaged with the sun gear and the ring gear; and a carrier coupled to the engine and supporting the pinions such that the pinions are rotatable.

Another aspect of the invention provides a control method for a vehicle that travels by rotating an output shaft coupled to a drive wheel using power of at least one of an engine and a motor. The vehicle includes: a generator that generates electric power using power of the engine; a battery that is configured to be connectable to the motor and the generator; and a controller that is configured to control the motor and the generator. The control method includes: driving the motor in pulse width modulation control when a vehicle speed is lower than a threshold, and driving the motor in rectangular control that has an improved output but poor controllability as compared with the pulse width modulation control when the vehicle speed exceeds the threshold; at the time of an abnormality of the battery, executing battery-less travel control in which the battery is isolated from the motor and the generator, the generator is caused to generate electric power by generating a torque, corresponding to at least any one of an accelerator operation amount and a vehicle required torque, from the generator, and the motor is driven by using the electric power generated by the generator, and, at the time of executing the battery-less travel control, when the vehicle speed exceeds a limit value corresponding to the threshold, executing at least one of a first process of limiting a rate of variation in the accelerator operation amount, a second process of limiting a rate of variation in the vehicle required torque and a third process of limiting a torque of the generator to thereby suppress losing a balance of input and output electric powers between the generator and the motor.

According to the above-described vehicle and control method therefor, it is possible to suppress application of an unstable voltage to the motor during battery-less travel control.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a view that schematically illustrates control modes of the second MG;

FIG. 5 is a view that shows the correlation between a vehicle operating point and a control mode of the second MG in a graph that shows the correlation between a speed of the vehicle and a driving torque of the vehicle;

FIG. 6 is a flowchart that shows the procedure of an ECU shown in FIG. 1 according to the first embodiment of the invention;

DETAILED DESCRIPTION OF EMBODIMENTS

Figure 1:
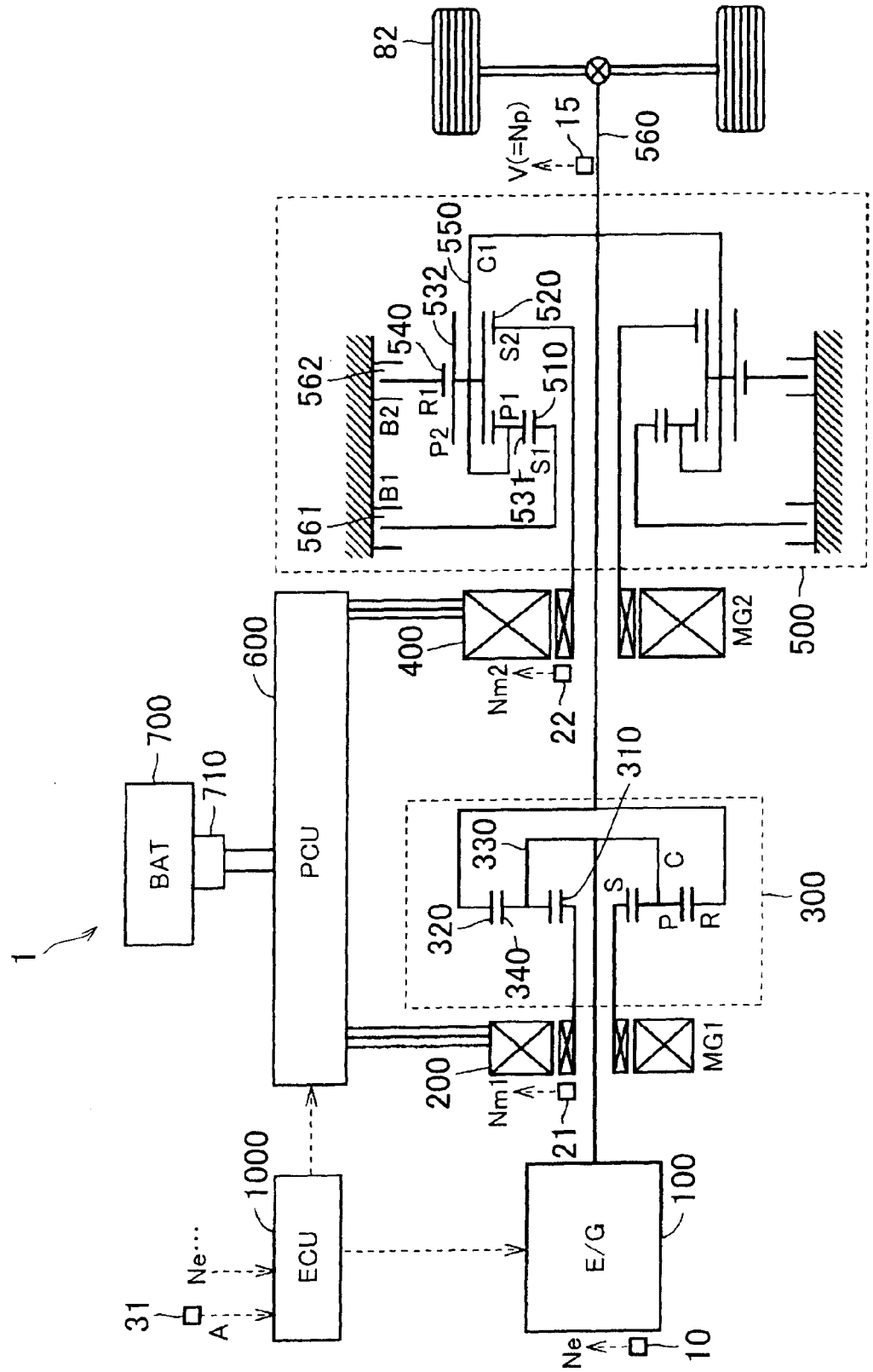
FIG. 1 is an overall block diagram of a vehicle according to a first embodiment of the invention.

Hereinafter, embodiments of the invention will be described with reference to the accompanying drawings. In the following description, like reference numerals denote the same components. The names and functions of them are also the same. Thus, the detailed description thereof is not repeated. FIG. 1 is an overall block diagram of a vehicle 1 according to a first embodiment. The vehicle 1 includes an engine 100, a first motor generator (MG) 200, a power split mechanism 300, a second MG 400, a transmission 500, a propeller shaft (output shaft) 560, a power control unit (PCU) 600, a battery 700, a system main relay (SMR) 710 and an electronic control unit (ECU) 1000.

The engine 100 is an internal combustion engine that outputs power by burning fuel. The power of the engine 100 is input to the power split mechanism 300.

The power split mechanism 300 splits power input from the engine 100 into power to the output shaft 560 and power to the first MG 200.

The power split mechanism 300 is a planetary gear mechanism that includes a sun gear (S) 310, a ring gear (R) 320, pinions (P) 340 and a carrier (C). The pinions (P) 340 are in mesh with the sun gear (S) 310 and the ring gear (R) 320. The carrier (C) 330 retains the pinions (P) 340 such that the pinions (P) 340 are rotatable and revolvable.

The carrier (C) 330 is coupled to a crankshaft of the engine 100. The sun gear (S) 310 is coupled to a rotor of the first MG 200. The ring gear (R) 320 is coupled to the output shaft 560.

The first MG 200 and the second MG 400 each are an alternating-current rotating electrical machine and function as both an electric motor (motor) and a power generator (generator). The power of the second MG 400 is input to the transmission 500.

The transmission 500 changes the rotation speed of the second MG 400 and then transmits the rotation to the output shaft 560. The transmission 500 is formed of a set of Ravigneaux planetary gear mechanism. That is, the transmission 500 includes a first sun gear (S1) 510, a second sun gear (S2) 520, first pinions (P1) 531, second pinions (P2) 532, a ring gear (R1) 540 and a carrier (C1) 550. The first pinions (P1) 531 are in mesh with the first sun gear (S1) 510. The second pinions (P2) are in mesh with the first pinions (P1) 531 and the second sun gear (S2) 520. The ring gear (R1) 540 is in mesh with the second pinions (P2) 532. The carrier (C1) 550 retains the pinions 531 and 532 such that each of the pinions 531 and 532 is rotatable and revolvable. Thus, the first sun gear (S1) 510 and the ring gear (R1) 540 constitute a mechanism that corresponds to a double-pinion-type planetary gear mechanism together with the pinions 531 and 532, and the second sun gear (S2) 520 and the ring gear (R1) 540 constitute a mechanism that corresponds to a single-pinion-type planetary gear mechanism together with the second pinions (P2) 532.

The carrier (C1) 550 is coupled to the output shaft 560. The second sun gear (S) 520 is coupled to a rotor of the second MG 400.

Furthermore, the transmission 500 includes a B1 brake 561 and a B2 brake 562. The B1 brake 561 selectively fixes the first sun gear (S1) 510. The B2 brake 562 selectively fixes the ring gear (R1) 540.

The B1 brake 561 generates engaging force from friction force between a friction material fixed to a case side of the transmission 500 and a friction material fixed to the first sun gear (S1) 510 side. The B2 brake 562 generates engaging force from friction force between a friction material fixed to the case side of the transmission 500 and a friction material fixed to the ring gear (R1) 540 side. These brakes 561 and 562 are connected to a shift hydraulic circuit (not shown) that outputs hydraulic pressure based on a control signal from the ECU 1000, and each are engaged or released by hydraulic pressure output from the shift hydraulic circuit.

When the first sun gear (S1) 510 is fixed by engaging the B1 brake 561 and the ring gear (R1) 540 is not fixed by releasing the B2 brake 562, the gear of the transmission 500 is a high-speed gear Hi. On the other hand, when the ring gear (R1) 540 is fixed by engaging the B2 brake 562 and the first sun gear (S1) 510 is fixed by releasing the B1 brake 561, the gear of the transmission 500 is a low-speed gear Lo having a higher speed ratio than the high-speed gear Hi. Note that the speed ratio is the ratio of an input shaft rotation speed of the transmission 500 (equal to the second MG rotation speed Nm2) with respect to an output shaft rotation speed of the transmission 500 (equal to the rotation speed Np of the output shaft 560).

The output shaft 560 rotates by using at least any one of power of the engine 100, transmitted via the power split mechanism 300, and power of the second MG 400, transmitted via the transmission 500. Rotational force of the output shaft 560 is transmitted to right and left drive wheels 82 via a speed reduction gear. By so doing, the vehicle 1 is caused to travel.

Figure 2:
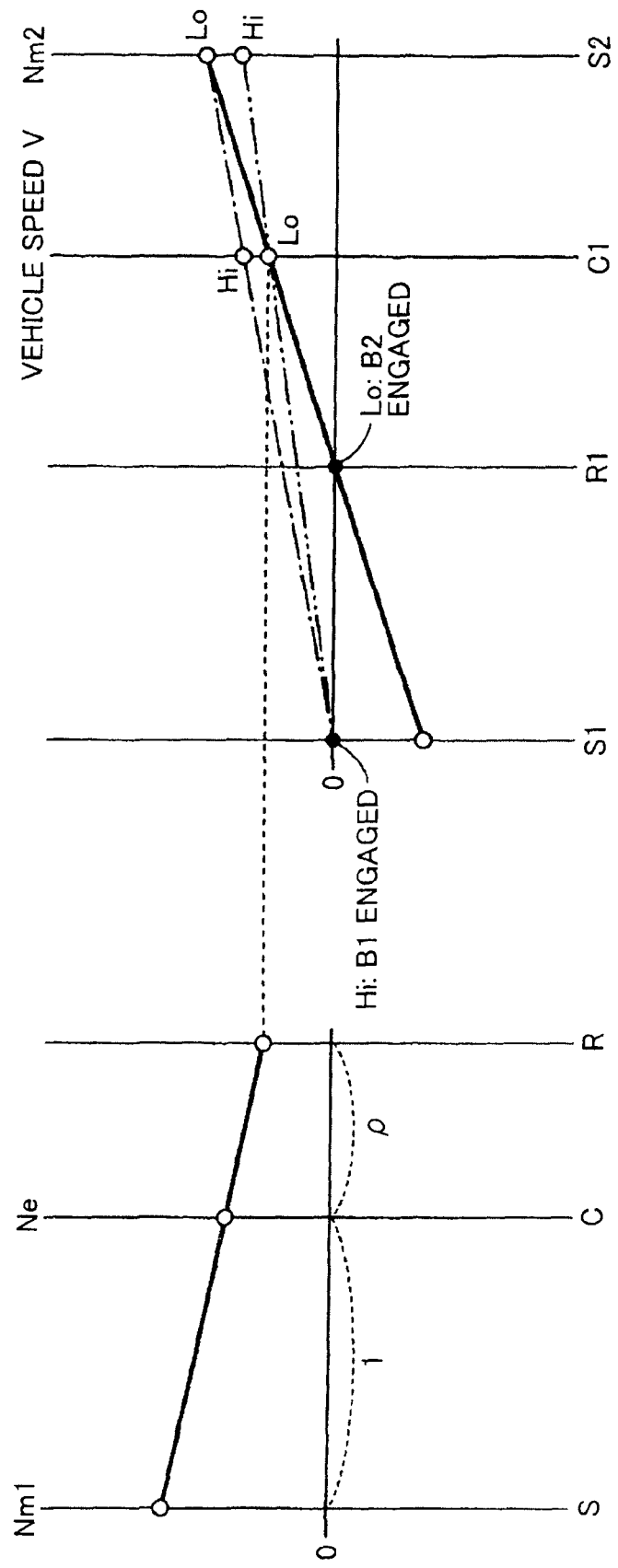
FIG. 2 shows nomographs of a power split mechanism and transmission that are shown in FIG. 1.

FIG. 2 shows a nomograph of the power split mechanism 300 and a nomograph of the transmission 500. When the power split mechanism 300 is configured as described above, the rotation speed of the sun gear (S) 310 (equal to first MG rotation speed Nm1), the rotation speed of the carrier (C) 330 (equal to engine rotation speed Ne) and the rotation speed of the ring gear (R) 320 have a relationship indicated by a line connected on the nomograph of the power split mechanism 300 (relationship that, when any two rotation speeds are determined, the remaining rotation speed is also determined).

In addition, when the transmission 500 is configured as described above, the rotation speed of the first sun gear (S1) 510, the rotation speed of the ring gear (R1) 540, the rotation speed of the carrier (C1) 550 and the rotation speed of the second sun gear (S2) 520 (equal to second MG rotation speed Nm2) have a relationship that is indicated by a line connected on the nomograph of the transmission 500 (relationship that, when any two rotation speeds are determined, the remaining rotation speed is also determined).

Because the carrier (C1) 550 of the transmission 500 is connected to the output shaft 560, the rotation speed of the carrier (C1) 550 coincides with the rotation speed of the output shaft 560 (that is, vehicle speed V). In addition, because the ring gear (R) 320 of the power split mechanism 300 is also connected to the output shaft 560, the rotation speed of the ring gear (R) 320 also coincides with the rotation speed of the output shaft 560 (that is, vehicle speed V).

At the low-speed gear Lo, the B2 brake 562 is engaged and, as a result, the ring gear (R1) 540 is fixed, so the rotation speed of the ring gear (R1) 540 becomes 0. In addition, at the high-speed gear Hi, the B1 brake 561 is engaged and, as a result, the first sun gear (S1) 510 is fixed, so the rotation speed of the first sun gear (S1) 510 becomes 0. Thus, when the second MG rotation speed Nm2 is the same, as shown in FIG. 2, due to the relationship between the collinear (alternate long and short dash line) of the high-speed gear Hi and the collinear (solid line) of the low-speed gear Lo, the vehicle speed V at the time when the high-speed gear Hi is established is higher than the vehicle speed V at the time when the low-speed gear Lo is established. Conversely, when the vehicle speed V is the same, as shown in FIG. 2, due to the relationship between the collinear (alternate long and two short dashes line) of the high-speed gear Hi and the collinear (solid line) of the low-speed gear Lo, the second MG rotation speed Nm2 at the time when the high-speed gear Hi is established is lower than the second MG rotation speed Nm2 at the time when the low-speed gear Lo is established.

Referring back to FIG. 1, the PCU 600 converts high-voltage direct-current electric power supplied from the battery 700 to alternating-current electric power and then outputs the alternating-current electric power to the first MG 200 and/or the second MG 400. By so doing, the first MG 200 and/or the second MG 400 are driven. In addition, the PCU 600 converts alternating-current electric power generated by, the first MG 200 and/or the second MG 400 to direct-current electric power and then outputs the direct-current electric power to the battery 700. By so doing, the battery 700 is charged.

The battery 700 is a secondary battery that stores high-voltage (for example, about 200 V) direct-current electric power for driving the first MG 200 and/or the second MG 400. The battery 700 is typically configured to include nickel-metal hydride or lithium ion. Note that, instead of the battery 700, a large-capacitance capacitor may be employed.

The SMR 710 is a relay for switching a connection state with an electrical system that includes the battery 700 and the PCU 600.

An engine rotation speed sensor 10, an output shaft rotation speed sensor 15, resolvers 21 and 22, an accelerator position sensor 31, and the like, are connected to the ECU 1000. The engine rotation speed sensor 10 detects the engine rotation speed Ne (the rotation speed of the engine 100). The output shaft rotation speed sensor 15 detects the rotation speed Np of the output shaft 560 as the vehicle speed V. The resolvers 21 and 22 respectively detect the first MG rotation speed Nm1 (the rotation speed of the first MG 200) and the second MG rotation speed Nm2 (the rotation speed of the second MG 400). The accelerator position sensor 31 detects an accelerator pedal operation amount A (an amount by which an accelerator pedal is operated by a user). These sensors output detected results to the ECU 1000.

The ECU 1000 incorporates a central processing unit (CPU) and a memory, and executes predetermined arithmetic processing on the basis of information stored in the memory and information from the sensors. The ECU 1000 controls various devices mounted on the vehicle 1 on the basis of the result of the arithmetic processing.

Figure 3:
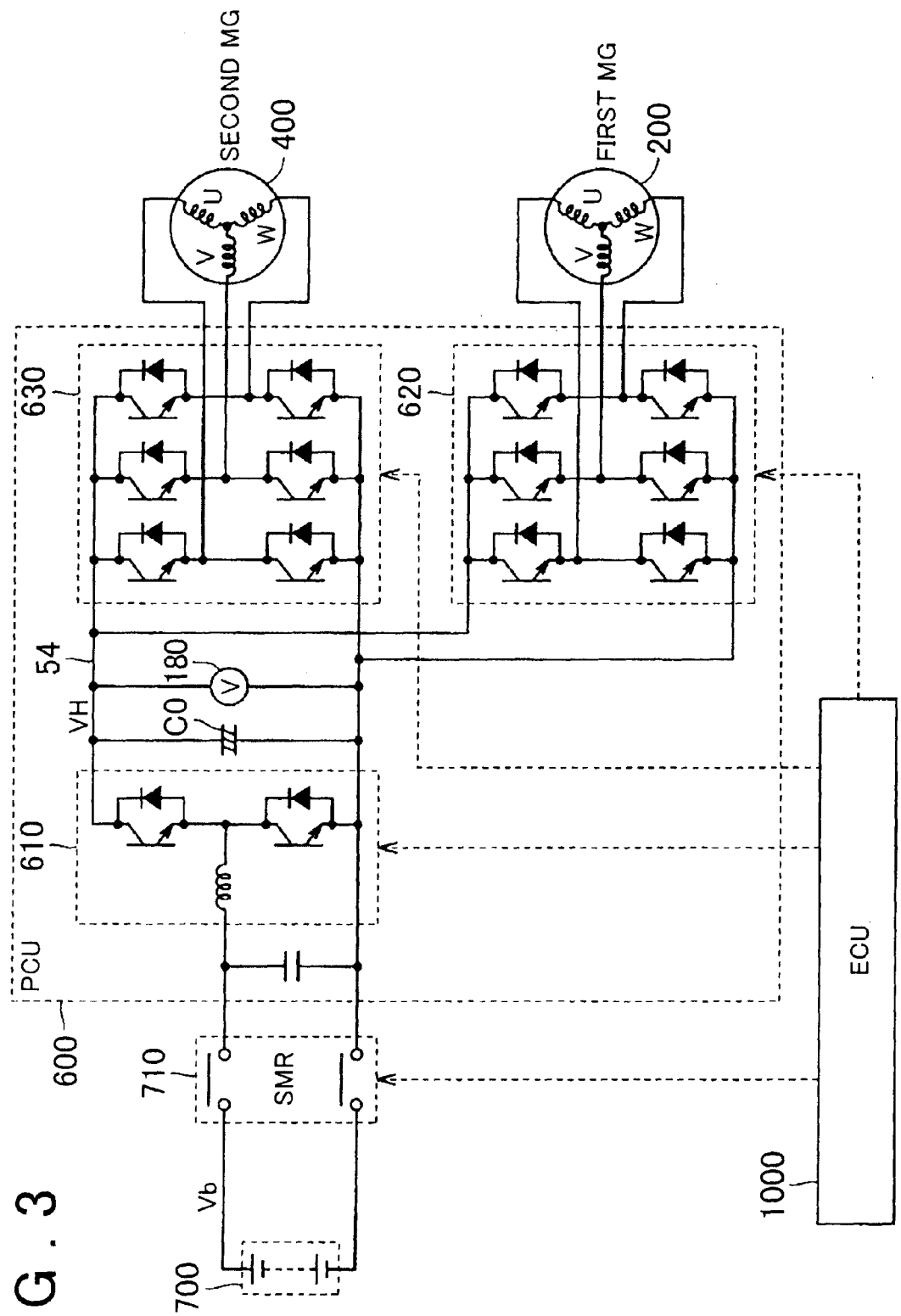
FIG. 3 is a circuit diagram of an electrical system for executing drive control over a first MG and a second MG that are shown in FIG. 1.

FIG. 3 is a circuit diagram of the electrical system for executing drive control over the first MG 200 and the second MG 400. The electrical system is formed of the first MG 200, the second MG 400, the PCU 600, the battery 700, the SMR 710 and the ECU 1000.

When the SMR 710 is in an off state, the battery 700 is isolated from the electrical system. When the SMR 710 is in an on state, the battery 700 is connected to the electrical system. The SMR 710 is controlled (turned on or off) in response to a control signal from the ECU 1000. For example, when the user makes an operation to start driving the vehicle to require start-up of the electrical system, the ECU 1000 turns on the SMR 710.

The PCU 600 includes a converter 610 and inverters 620 and 630. The converter 610 has a general boost chopper circuit formed of a reactor and two switching elements. An antiparallel diode is connected to each of the switching elements.

The inverters 620 and 630 are connected to the converter 610 in parallel with each other. The inverter 620 is connected between the converter 610 and the first MG 200. The inverter 620 includes a U-phase arm, a V-phase arm and a W-phase arm. The U-phase arm, the V-phase arm and the W-phase arm are connected in parallel with one another. The U-phase arm, the V-phase arm and the W-phase arm each include two serially connected switching elements (an upper arm and a lower arm). An antiparallel diode is provided for each of the switching elements.

The inverter 630 is connected between the converter 610 and the second MG 400. The inverter 630, as well as the inverter 620, has a general three-phase inverter configuration. That is, the inverter 630 includes three pairs of upper arm and lower arm for three phases (U phase, V phase and W phase) and antiparallel diodes respectively for the arms.

Direct-current voltage (hereinafter, also referred to as "system voltage VH") at power lines 54 between the converter 610 and the inverters 620 and 630 is detected by a voltage sensor 180. The result detected by the voltage sensor 180 is output to the ECU 1000.

The converter 610 carries out bidirectional direct-current voltage conversion between the system voltage VH and the voltage Vb of the battery 700. When electric power discharged from the battery 700 is supplied to the first MG 200 or the second MG 400, the voltage is stepped up by the converter 610. On the other hand, when the battery 700 is charged with electric power generated by the first MG 200 or the second MG 400, the voltage is stepped down by the converter 610.

The inverter 620 converts the system voltage VH to alternating-current voltage by turning on or off the switching elements. The converted alternating-current voltage is supplied to the first MG 200. In addition, the inverter 620 converts alternating-current electric power generated by the first MG 200 to direct-current electric power.

Similarly, the inverter 630 converts the system voltage VH to alternating-current voltage and supplies the alternating-current voltage to the second MG 400. In addition, the inverter 630 converts alternating-current electric power generated by the second MG 400 to direct-current electric power.

In this way, the power lines 54 that electrically connect the converter 610 to the inverters 620 and 630 are respectively formed as a positive electrode bus line and a negative electrode bus line that are shared by the inverters 620 and 630. The power lines 54 are electrically connected to both the first MG 200 and the second MG 400, so electric power generated by one of the first MG 200 and the second MG 400 is allowed to be consumed at the other one.

Thus, in a state where the SMR 710 is in an on state and the battery 700 is connected to the electrical system, the battery 700 is charged with electric power generated from any one of the first MG 200 and the second MG 400 or discharged through electric power that is short in any one of the first MG 200 and the second MG 400. On the other hand, in a state where the SMR 710 is in an off state and the battery 700 is isolated from the electrical system, the battery 700 cannot be used as an electric power buffer, so it is required to keep the balance of input and output electric powers between the first MG 200 and the second MG 400.

The ECU 1000 executes drive control over the first MG 200 and the second MG 400 by respectively controlling switching operations of the inverters 620 and 630. Specifically, the ECU 1000 sets a first MG torque command value T1com and a second MG torque command value T2com on the basis of the accelerator pedal operation amount A and the vehicle speed V, and outputs switching control signals to the inverters 620 and 630 such that an actual torque of the first MG 200 and an actual torque of the second MG 400 respectively coincide with the first MG torque command value T1com and the second MG torque command value T2com.

FIG. 4 is a view that schematically illustrates control modes of the second MG 400 (that is, control modes of the inverter 630). In the vehicle 1 according to the first embodiment, the control mode of the inverter 630 is switched into any one of a PWM control mode and a rectangular control mode.

In the PWM control mode, any one of sinusoidal PWM control and overmodulation PWM control is executed. The sinusoidal PWM control is used as a general PWM control method, and on/off states of the switching elements in each phase arm are controlled in accordance with a comparison in voltage between a sinusoidal voltage command value and a carrier wave (carrier signal). As a result, the fundamental component of a line-to-line voltage (hereinafter, also simply referred to as "inverter output voltage") output from the inverter 630 to the second MG 400 within a set period forms a pseudo-sinusoidal wave. As is known, in sinusoidal PWM control, the amplitude of the fundamental component can just be increased about 0.61 times of the inverter input voltage (the modulation factor can just be increased to 0.61).

The overmodulation PWM control is to execute the same PWM control as the above-described sinusoidal PWM control after the amplitude of the carrier is distorted to be reduced. As a result, it is possible to increase the modulation factor to the range of 0.61 to 0.78. Thus, in a range in which PWM control is executed, sinusoidal PWM control is executed in the case where the vehicle speed is relatively low, and overmodulation PWM control is executed in the case where the vehicle speed is relatively high.

On the other hand, in the rectangular control mode, rectangular control is executed. In the rectangular control, switching operation is performed once within the set period. As a result, the inverter output voltage within the set period is a one-pulse rectangular voltage. By so doing, rectangular control is poor in control accuracy (control response) but is able to increase the modulation factor to 0.78 as compared with PWM control, so it is possible to increase motor output.

In consideration of a difference between the characteristics of these control modes, the ECU 1000 selects the control mode on the basis of a region to which the vehicle operating point determined by the vehicle driving torque (the driving torque of the output shaft 560) and the vehicle speed V (corresponding to the rotation speed Np of the output shaft 560, that is, corresponding to the second MG rotation speed Nm2) belongs.

FIG. 5 is a graph that shows the correlation between the vehicle operating point and the control modes of the second MG 400 (inverter 630). Schematically, the PWM control mode having a relatively high controllability is selected in order to reduce torque fluctuations in a low rotation speed-side region A1 with respect to a control boundary line L, and the rectangular control mode is selected in order to improve the output of the second MG 400 in a high rotation speed-side region A2 with respect to the control boundary line L.

In the first embodiment, the control boundary line L is set to different values between when the high-speed gear Hi is established and when the low-speed gear Lo is established. That is, as shown in the above-described FIG. 2, when the vehicle speed V is the same, the second MG rotation speed Nm2 is lower when the high-speed gear Hi is established than when the low-speed gear Lo is established. In consideration of this point, the ECU 1000 sets a control boundary line L2 at the time when the high-speed gear Hi is established such that the control boundary line L2 is set at a higher vehicle speed side than the control boundary line L1 at the time when the low-speed gear Lo is established. By so doing, it becomes harder to shift into the rectangular control mode when the high-speed gear Hi is established than when the low-speed gear Lo is established.

Next, battery-less travel control will be described. When charging or discharging is prohibited due to occurrence of an abnormality in the battery 700, the ECU 1000 executes fail-safe control in which the vehicle 1 is caused to travel in a state where the SMR 710 is set in an off state and the battery 700 is isolated from the electrical system. The fail-safe control is the "battery-less travel control".

During battery-less travel control, the battery 700 cannot be used as the electric power buffer, so it is required to keep the balance of input and output electric powers between the first MG 200 and the second MG 400. That is, while travelling in battery-less travel control, the second MG 400 needs to be driven by using electric power generated by the first MG 200, and it is required to execute control such that the amount of electric power generated by the first MG 200 is equal to the amount of electric power consumed by the second MG 400.

FIG. 6 is a flowchart that shows the procedure of the ECU 1000 during battery-less travel control.

In S10, the ECU 1000 calculates a vehicle required torque Treq on the basis of the accelerator pedal operation amount A and the vehicle speed V. For example, the ECU 1000 prestores a map that defines the correlation among the accelerator pedal operation amount A, the vehicle speed V and the vehicle required torque Treq, and calculates the vehicle required torque Treq corresponding to an actual accelerator pedal operation amount A and an actual vehicle speed V with the use of the map.

In S11, the ECU 1000 calculates an engine required power Pereq from the vehicle required torque Treq. More specifically, the ECU 1000 calculates the product (equal to vehicle required power) of the vehicle required torque Treq and the output shaft rotation speed Np as the engine required power Pereq.

In S12, the ECU 1000 calculates an engine rotation speed target value Nereq and an engine torque target value Tereq that satisfy the engine required power Pereq. For example, the ECU 1000 presets an optimal engine operating line that is determined by the engine rotation speed Ne and the engine torque Te, and calculates the engine rotation speed target value Nereq and the engine torque target value Tereq that satisfy the engine required power Pereq with the use of the optimal engine operating line.

In S13, the ECU 1000 calculates a first MG torque target value T1req, which is the reaction force of the engine torque Te, from the engine required power Pereq and the engine rotation speed target value Nereq. When the planetary gear ratio of the power split mechanism 300 is "ρ", the relational expression expressed by $T1=\rho/(1+\rho) \times Te$ holds between the first MG torque T1 and the engine torque Te on the basis of the mechanical relationship. The engine torque Te is a value obtained by dividing the engine power Pe by the engine rotation speed Ne, so the ECU 1000 calculates the first MG torque target value T1req using the following mathematical expression (1).

$$T1req=\rho/(1+\rho) \times Tereq=\rho/(1+\rho) \times (Pereq/Nereq) \quad (1)$$

Note that, during battery-less travel control, in order to set the first MG 200 in a power generating state, the first MG torque target value T1req is set to a negative value (T1req<0). As the first MG torque target value T1req reduces, the torque generated through power generation of the first MG 200 (hereinafter, also referred to as "negative torque of the first MG 200") increases, so the amount of electric power generated by the first MG 200 increases.

In S14, the ECU 1000 calculates a second MG torque target value T2req such that a first MG target power (equal to a target value of the amount of electric power generated by the first MG 200) is equal to a second MG target power (equal to a target value of the amount of electric power consumed by the second MG 400). Specifically, the ECU 1000 calculates the second MG torque target value T2req using the following mathematical expression (2).

$$T2req=(T1req \times Nm1)/Nm2 \quad (2)$$

In S15, the ECU 1000 respectively sets the calculated engine torque target value Tereq, first MG torque target value T1req and second MG torque target value T2req for an engine torque command value Tecom, the first MG torque command value Tecom and the second MG torque command value T2com.

In this way, during battery-less travel control, in order to keep the balance of input and output electric powers between the first MG 200 and the second MG 400, the torque command values are set such that the amount of electric power generated by the first MG 200 is equal to the amount of electric power consumed by the second MG 400. However, if the control mode of the second MG 400 is switched to the rectangular control mode having a relatively poor controllability, the control accuracy of the second MG torque T2 deteriorates and, as a result, the amount of electric power generated by the first MG 200 may not coincide with the amount of electric power consumed by the second MG 400, and the inverter output voltage may become unstable.

Particularly, a situation that the inverter output voltage becomes unstable is a pattern that the vehicle required power steeply changes, typically, a pattern that an accelerator on state (accelerator pedal operation amount A>0) and an accelerator off state (accelerator pedal operation amount A=0) are repeated. When the accelerator is set in an on state, the absolute value of negative torque of the first MG 200 is increased in order to increase the amount of electric power generated by the first MG 200 (equal to the output power of the second MG 400). The engine torque Te is increased in order to prevent a decrease in the engine rotation speed Ne due to an increase in the absolute value of negative torque of the first MG 200; however, actually, the engine rotation speed Ne temporarily decreases due to a delay of control over the engine 100. With the temporary decrease in the engine rotation speed Ne, the first MG rotation speed Nm1 also temporarily decreases (refer to the nomograph shown in FIG. 2). Thus, the amount of electric power generated by the first MG 200 decreases, so it is required to decrease the output power of the second MG 400 by an amount corresponding to the decrease in the amount of electric power generated by the first MG 200 in order to keep the balance of input and output electric powers; however, in the rectangular control mode having a relatively poor controllability, there occurs a delay of a decrease in the output power of the second MG 400 and then the system voltage VH decreases and, as a result, the inverter output voltage decreases. Thus, if the accelerator on state and the accelerator off state are repeated at high vehicle speeds, a decrease in the inverter output voltage is repeated and, as a result, the inverter output voltage becomes unstable. In the vehicle in which a fail-safe that sets the inverters 620 and 630 in a shutdown state (stopped state) is performed when the system voltage VH becomes lower than or equal to a predetermined value, it may be not possible to continue vehicle travelling due to a decrease in the system voltage VH.

Then, in the first embodiment, at the time of high vehicle speeds during battery-less travel control, the process of stabilizing the inverter output voltage (specifically, the process of filtering the accelerator pedal operation amount A, described later) is executed. By so doing, losing the balance of input and output electric powers between the first MG 200 and the second MG 400 is suppressed. Thus, even if the control mode shifts into rectangular control, it is possible to stabilize the inverter output voltage. This point is the most characterizing portion of the first embodiment.

Figure 7:
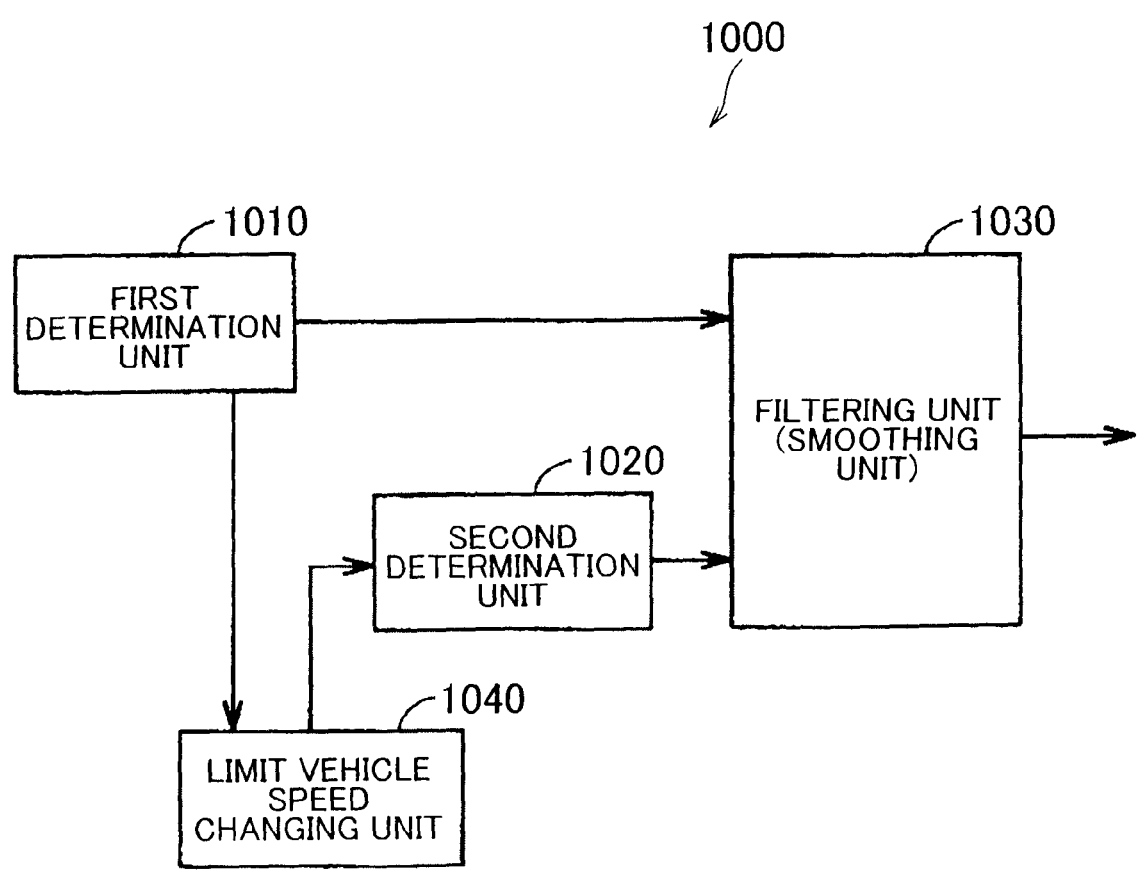
FIG. 7 is a functional block diagram of the ECU.

FIG. 7 is a functional block diagram of the ECU 1000 at the time when the inverter output voltage is stabilized. The functional blocks shown in FIG. 7 may be implemented by hardware or may be implemented by software.

The ECU 1000 includes a first determination unit 1010, a second determination unit 1020, a filtering unit 1030 and a limit vehicle speed changing unit 1040.

The first determination unit 1010 determines whether battery-less travel control is being executed. The limit vehicle speed changing unit 1040 changes a limit vehicle speed Vsh on the basis of a gear established in the transmission 500 (the speed ratio of the transmission 500). The limit vehicle speed Vsh is used in determination made by the second determination unit 1020. The limit vehicle speed changing unit 1040 sets the limit vehicle speed Vsh to "Vsh1" when the low-speed gear Lo is established, and sets the limit vehicle speed Vsh to "Vsh2" that is higher than Vsh1 when the high-speed gear Hi having a smaller speed ratio than the low-speed gear Lo is established. In the first embodiment, the limit vehicle speed Vsh1 at the time when the low-speed gear Lo is established is set to the lowest speed-side value of the control boundary line L1 at the time when the low-speed gear Lo is established. In addition, the limit vehicle speed Vsh2 at the time when the high-speed gear Hi is established is set to the lowest speed-side value of the control boundary line L2 at the time when the high-speed gear Hi is established (see FIG. 5).

Note that the vehicle 1 according to the first embodiment includes the transmission 500, so the function of the limit vehicle speed changing unit 1040 is effective; however, in a vehicle that does not include a transmission, the function of the limit vehicle speed changing unit 1040 (the function of changing the limit vehicle speed Vsh on the basis of whether the low-speed gear Lo or the high-speed gear Hi is established) is not required.

The second determination unit 1020 determines whether the vehicle speed V exceeds the limit vehicle speed Vsh set in the limit vehicle speed changing unit 1040.

The filtering unit 1030 filters (smoothes) the accelerator pedal operation amount A when the vehicle speed V exceeds the limit vehicle speed Vsh during battery-less travel control. Specifically, the filtering unit 1030 filters an actual accelerator pedal operation amount A detected by the accelerator position sensor 31. The filtered accelerator pedal operation amount A is used as a parameter to calculate a vehicle required torque Treq during battery-less travel control (the process of S10 in FIG. 6).

Here, for example, first-order lag process, second-order lag process, moving average process, and the like, may be used as the "filtering". With any of the processes, the filtered accelerator pedal operation amount A varies more gently than the actual accelerator pedal operation amount A. By gently varying the accelerator pedal operation amount A (limiting the rate of variation in the accelerator pedal operation amount A) through filtering in this way, a steep variation in the first MG torque target value T1req (that is, a steep variation in the amount of electric power generated by the first MG 200) is suppressed. Therefore, a chance that the inverter output voltage becomes unstable is excluded, so the voltage is stabilized.

On the other hand, when battery-less travel control is being executed but the vehicle speed V is lower than the limit vehicle speed Vsh (that is, when not rectangular control but PWM control is executed), the filtering unit 1030 does not filter the accelerator pedal operation amount A. By so doing, power performance is maintained during PWM control. Note that the filtering unit 1030 does not filter the accelerator pedal operation amount A when battery-less travel control is not being executed as well.

Figure 8:
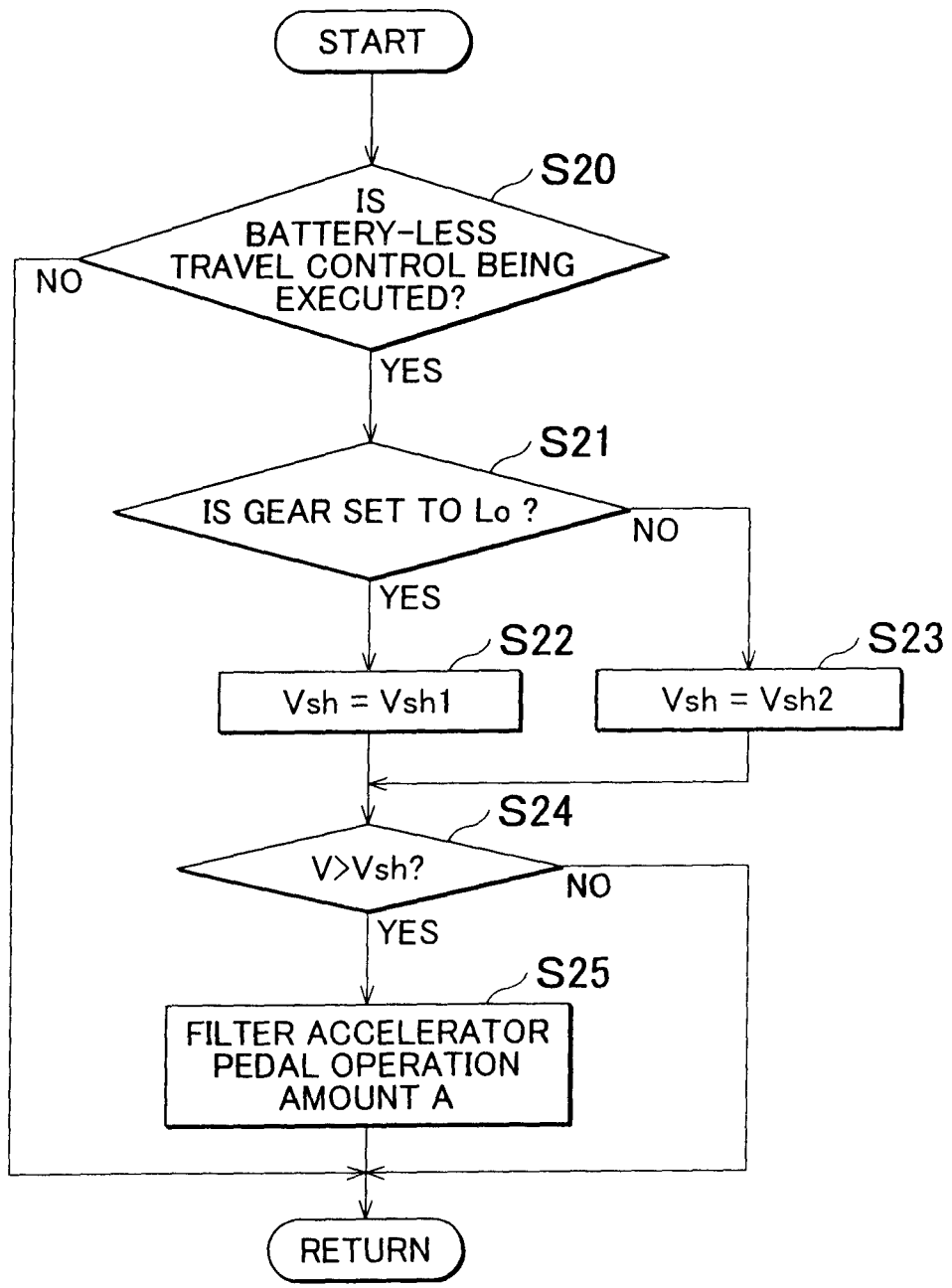
FIG. 8 is a flowchart that shows the procedure of the ECU in the first embodiment of the invention.

FIG. 8 is a flowchart that shows the procedure of the ECU 1000 for implementing the above-described functions. In S20, the ECU 1000 determines whether battery-less travel control is being executed. In S21, the ECU 1000 determines whether the gear established in the transmission 500 is the low-speed gear Lo.

When the low-speed gear Lo is established (YES in S21), the ECU 1000 sets the limit vehicle speed Vsh to "Vsh1" in S22 (see FIG. 5), and then proceeds with the process to S24. On the other hand, when the high-speed gear Hi is established (NO in S21), the ECU 1000 sets the limit vehicle speed Vsh to "Vsh2" in S23 (see FIG. 5), and then proceeds with the process to S24. Note that, as described above, in a vehicle that does not include a transmission, the functions of S21 to S23 are not required.

In S24, the ECU 1000 determines whether the vehicle speed V exceeds the limit vehicle speed Vsh. When the vehicle speed V exceeds the limit vehicle speed Vsh (YES in S24), the ECU 1000 filters the accelerator pedal operation amount A in S25 as described above.

On the other hand, when the vehicle speed V is lower than the limit vehicle speed Vsh (NO in S24), the ECU 1000 ends the process without filtering the accelerator pedal operation amount A.

As described above, in the first embodiment, at the time of executing battery-less travel control, when the vehicle speed V exceeds the limit vehicle speed Vsh, losing the balance of input and output electric powers between the first MG 200 and the second MG 400 is suppressed by filtering the accelerator pedal operation amount A. Thus, even if the control mode shifts into rectangular control, it is possible to stabilize the inverter output voltage.

In addition, in the first embodiment, when the vehicle speed V is lower than the limit vehicle speed Vsh, it is possible to ensure power performance during PWM control by not filtering the accelerator pedal operation amount A. Thus, it is possible to achieve both maintaining power performance during PWM control and stabilizing voltage during rectangular control.

Note that, in the first embodiment, filtering is performed on the basis of the vehicle speed V; instead, more directly, filtering may be performed on the basis of the condition that "rectangular control is being executed". That is, in S24 of FIG. 8, instead of determining "whether the vehicle speed V exceeds the limit vehicle speed Vsh", it may be determined "whether rectangular control is being executed".

When filtering is performed on the condition that "rectangular control is being executed" in which controllability is poor and the inverter output voltage tends to be unstable, it is possible to more directly prevent losing the balance of input and output electric powers during rectangular control.

On the other hand, as in the case of the first embodiment, by performing filtering on the basis of the vehicle speed V, it is possible to ensure voltage stability even during overmodulation PWM control in addition to during rectangular control. That is, with an increase in the vehicle speed V, the control mode gradually changes toward a control mode having a poor controllability in order of sinusoidal PWM control, overmodulation PWM control and rectangular control, and even overmodulation PWM control also has a poor stable controllability of the inverter output voltage (system voltage VH) as compared with sinusoidal PWM control. Therefore, by performing filtering on the basis of the vehicle speed V, it is possible to achieve voltage stability not only in a rectangular control region but also in an overmodulation PWM control region by performing filtering in both regions. In the first embodiment, the "accelerator pedal operation amount A" is set as a filtering target.

Figure 9:
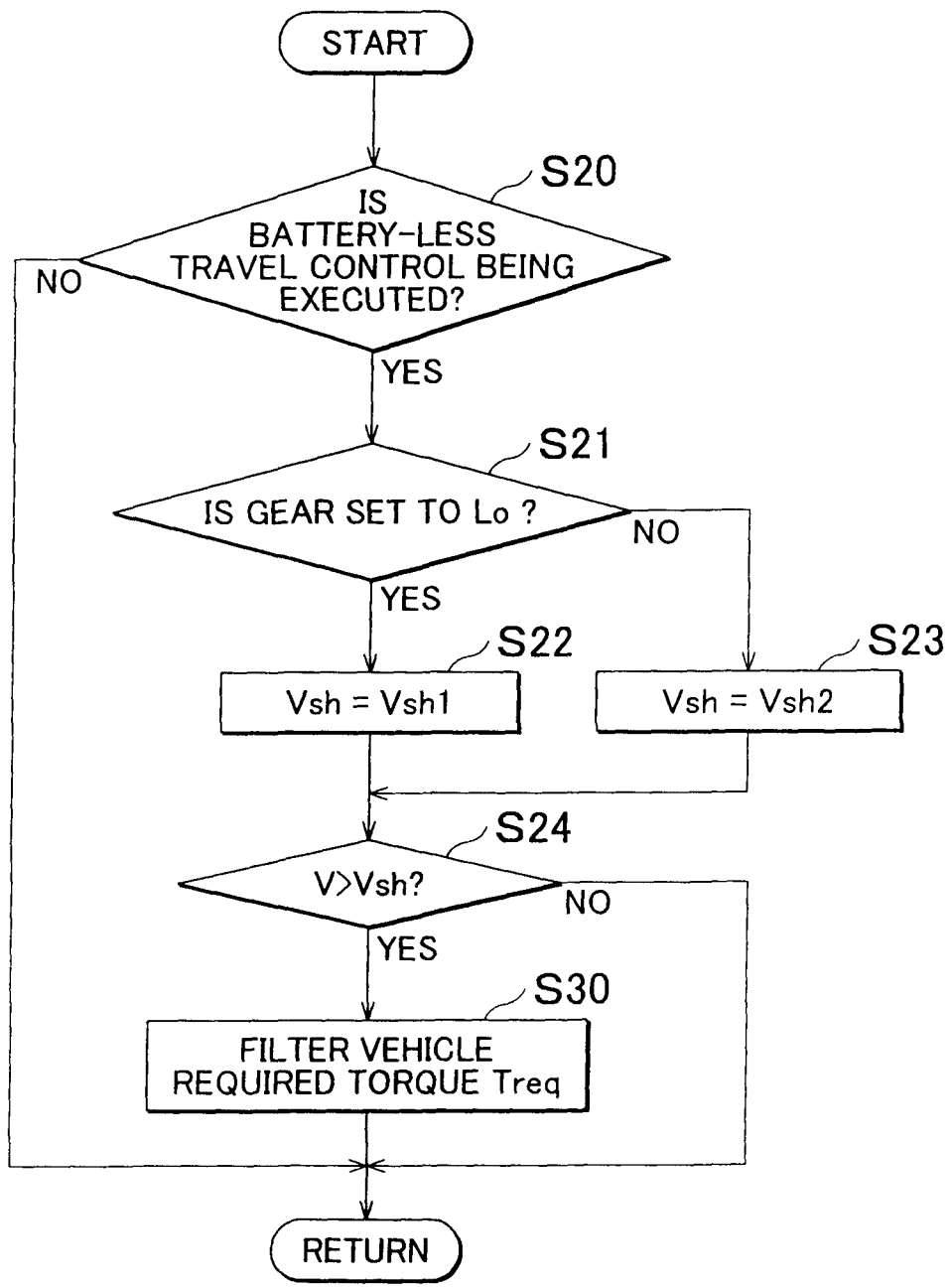
FIG. 9 is a flowchart that shows the procedure of the ECU according to a second embodiment of the invention.

In contrast to this, in a second embodiment, the "vehicle required torque Treq" is set as a filtering target. The other structure, functions and processes are the same as the above-described first embodiment, so the detailed description is not repeated here. FIG. 9 is a flowchart that shows the procedure of the ECU 1000 according to the second embodiment. Note that, among steps shown in FIG. 9, steps assigned with like step numbers to those of the above-described steps shown in FIG. 8 have been already described and the detailed description is not repeated here.

When the vehicle speed V exceeds the limit vehicle speed Vsh (YES in S24), the ECU 1000 filters (smoothes) the vehicle required torque Treq in S30. Specifically, the ECU 1000 filters the "vehicle required torque Treq" calculated in the above-described process of S10 in FIG. 6. By so doing, the filtered vehicle required torque Treq more gently varies than the pre-filtered vehicle required torque Treq. The filtered vehicle required torque Treq is used as a parameter to calculate the engine required power Pereq during battery-less travel control (process of S11 in FIG. 6). By gently varying the vehicle required torque Treq (limiting the rate of variation in the vehicle required torque Treq) through filtering in this way, a steep variation in the first MG torque target value T1req (that is, a steep variation in the amount of electric power generated by the first MG 200) is suppressed. Therefore, a chance that the inverter output voltage becomes unstable is excluded, so the voltage is stabilized.

On the other hand, when the vehicle speed V is lower than the limit vehicle speed Vsh (NO in S24), the ECU 1000 ends the process without filtering the vehicle required torque Treq. By so doing, power performance is maintained during PWM control.

As described above, in the present embodiment, by filtering the "vehicle required torque Treq", as in the case of the above-described first embodiment, it is possible to stabilize the inverter output voltage during rectangular control.

Note that, in the second embodiment as well, as in the case of the above-described first embodiment, in a vehicle that does not include a transmission, the functions of S21 to S23 in FIG. 9 are not required.

In addition, in the second embodiment as well, as in the case of the above-described first embodiment, filtering is performed on the basis of the vehicle speed V; instead, more directly, filtering may be performed on the condition that "rectangular control is being executed". In the first and second embodiments, voltage stability during rectangular control is achieved by gently varying the accelerator pedal operation amount A or the vehicle required torque Treq through filtering.

In contrast to this, in a third embodiment of the invention, voltage stability is achieved by limiting the first MG torque T1. The other structure is the same as those of the above-described first and second embodiments, so the detailed description is not repeated here.

Figure 10:
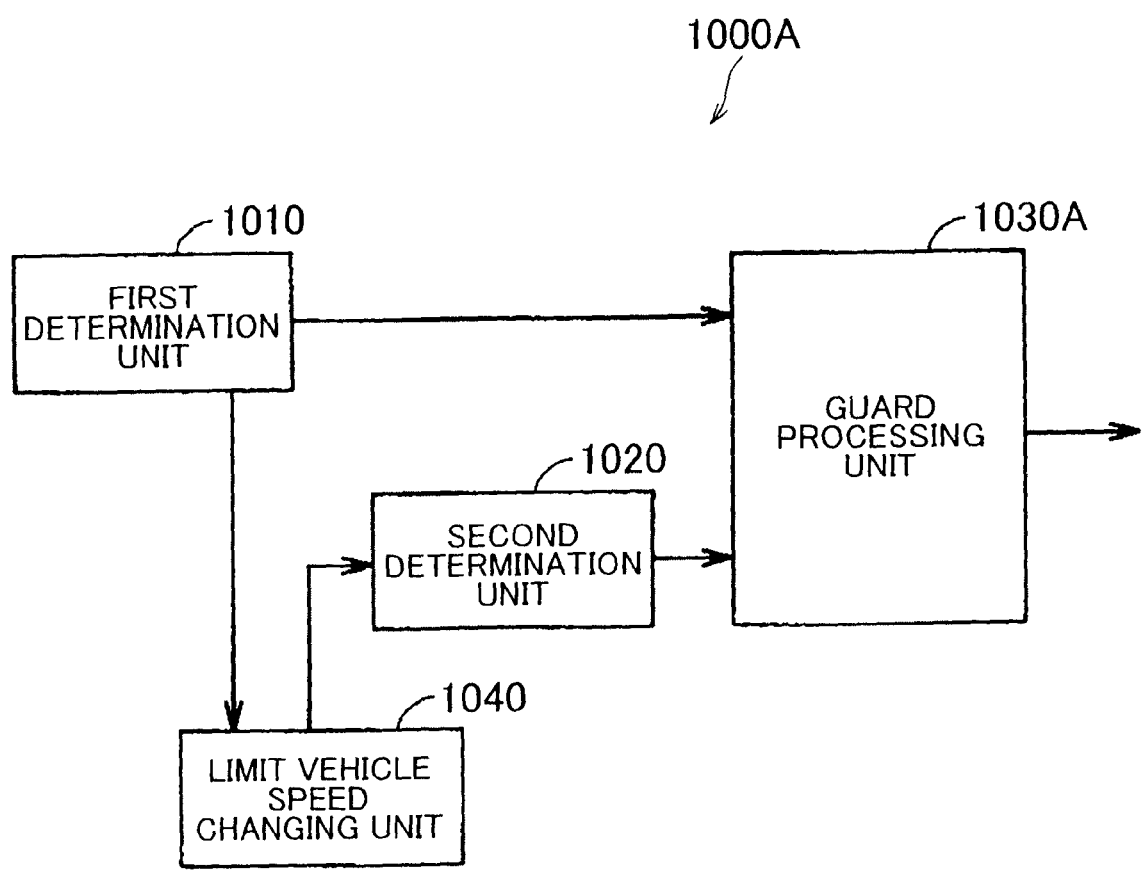
FIG. 10 is a functional block diagram of an ECU according to a third embodiment of the invention.

FIG. 10 is a functional block diagram of an ECU 1000A according to the third embodiment. The ECU 1000A includes the first determination unit 1010, the second determination unit 1020, a guard processing unit 1030A and the limit vehicle speed changing unit 1040. Note that the functions of the first determination unit 1010, second determination unit 1020 and limit vehicle speed changing unit 1040 have been already described in FIG. 7 above, so the detailed description is not repeated here.

The guard processing unit 1030A executes guard process over the first MG torque T1 when the vehicle speed V exceeds the limit vehicle speed Vsh during battery-less travel control. Specifically, the guard processing unit 1030A executes control such that the first MG torque target value T1req (<0) during battery-less travel control does not decrease to below a predetermined lower limit torque Tmin (<0) in order to suppress an increase in the absolute value of negative torque of the first MG 200 (torque generated through power generation of the first MG 200) during battery-less travel control. By so doing, an increase in the absolute value of negative torque of the first MG 200 is suppressed and a temporary decrease in the engine rotation speed Ne is suppressed, so a temporary decrease in the amount of electric power generated by the first MG 200 is also suppressed. Therefore, even when there occurs a delay of decrease in the output power of the second MG 400 in rectangular control, it is possible to suppress a decrease in the system voltage VH, so a chance that the inverter output voltage becomes unstable is excluded, and voltage stability is achieved.

On the other hand, when battery-less travel control is being executed but the vehicle speed V is lower than the limit vehicle speed Vsh (that is, when not rectangular control but PWM control is executed), the guard processing unit 1030A does not execute guard process over the first MG torque T1. By so doing, power performance is maintained during PWM control. Note that the guard processing unit 1030A does not execute guard process over the first MG torque T1 when battery-less travel control is not being executed as well.

Figure 11:
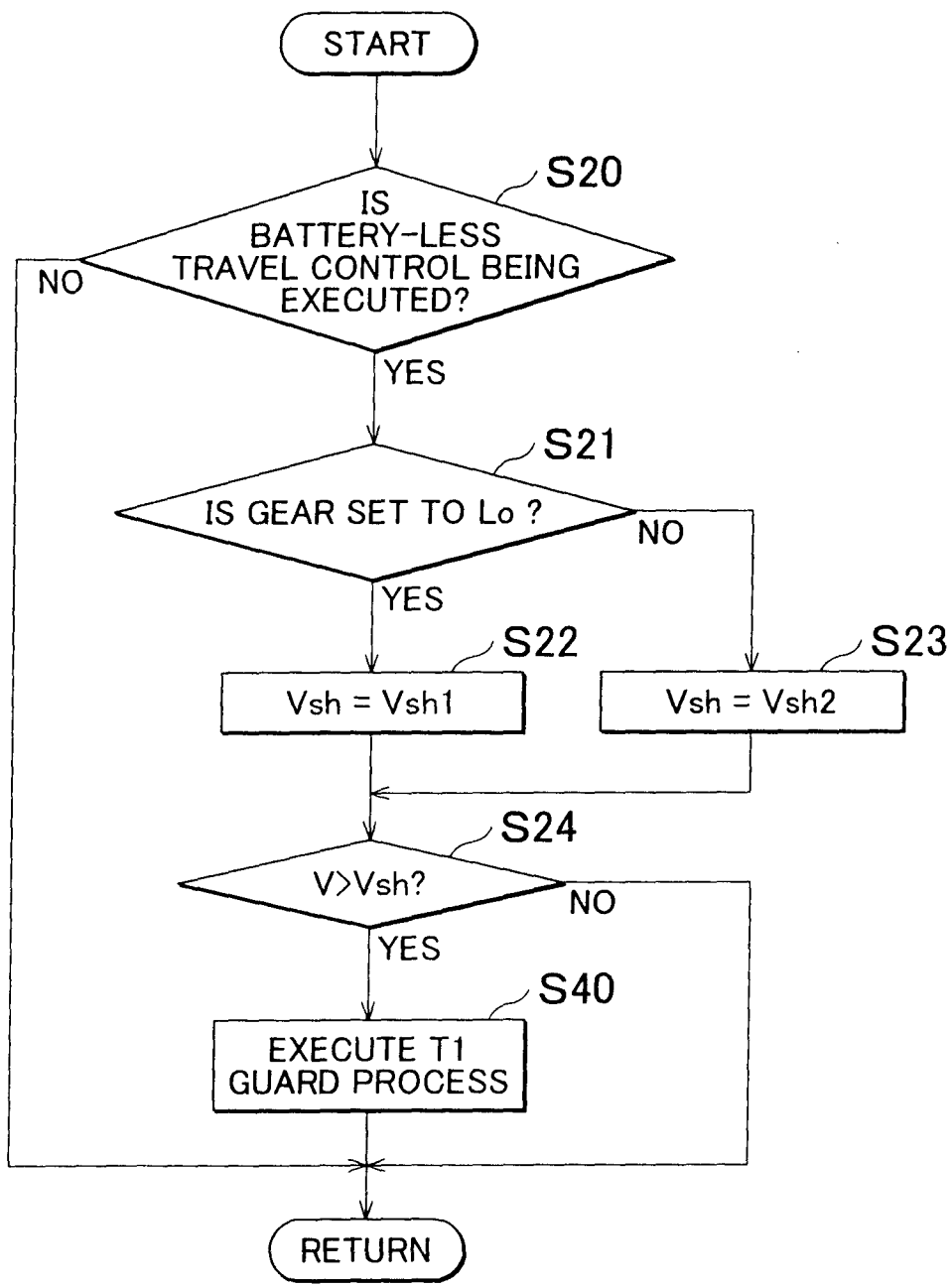
FIG. 11 is a flowchart that shows the procedure of the ECU according to the third embodiment of the invention.

FIG. 11 is a flowchart that shows the procedure of the ECU 1000A for implementing the above-described functions. Note that, among steps shown in FIG. 11, steps assigned with like step numbers to those of the above-described steps shown in FIG. 8 have been already described and the detailed description is not repeated here.

When the vehicle speed V exceeds the limit vehicle speed Vsh (YES in S24), the ECU 1000A executes the above-described guard process over the first MG torque T1 in S40.

On the other hand, when the vehicle speed V is lower than the limit vehicle speed Vsh (NO in S24), the ECU 1000A ends the process without executing guard process over the first MG torque T1.

As described above, in the third embodiment, by executing guard process over the first MG torque T1, as in the case of the above-described first and second embodiments, it is possible to stabilize the inverter output voltage during rectangular control.

Note that, as in the case of the above-described first and second embodiments, in a vehicle that does not include a transmission, the functions of S21 to S23 in FIG. 11 are not required.

In addition, in the third embodiment as well, as in the case of the above-described first and second embodiments, guard process over the first MG torque T1 is executed on the basis of the vehicle speed V; instead, more directly, guard process over the first MG torque T1 may be executed on the condition that "rectangular control is being executed".

In addition, it is possible to combine the first to third embodiments as needed. The embodiments described above are illustrative and not restrictive in all respects. The scope of the invention is indicated not by the above description but by the appended claims, and is intended to include all modifications within the meaning and scope equivalent to the scope of the appended claims.

The invention claimed is:

1. A vehicle that travels by rotating an output shaft coupled to a drive wheel using power of at least one of an engine and a motor, comprising:
   a generator that generates electric power using power of the engine;
   a battery that is configured to be connectable to the motor and the generator; and
   a controller that is programmed to:

drive the motor in a pulse width modulation control when a vehicle speed is lower than a threshold, drive the motor in rectangular control, which has an improved output but poor controllability as compared with the pulse width modulation, when the vehicle speed exceeds the threshold, determine an abnormality of the battery, execute, if the battery is determined to be abnormal, a battery-less travel control in which the battery is isolated from the motor and the generator, the generator is caused to generate electric power by generating a torque, corresponding to at least any one of an accelerator operation amount and a vehicle required torque, from the generator, and the motor is driven by using the electric power generated by the generator, determine, if the battery-less travel control is executed, if the vehicle speed exceeds the threshold, and execute, if the vehicle speed is determined to exceed the threshold, at least one of a first process, a second process, and a third process to thereby suppress losing a balance of input and output electric powers between the generator and the motor, wherein the controller is further programmed to:
in the first process, limit a rate of variation in the accelerator operation amount,
in the second process, limit rate of variation in the vehicle required torque, and
in the third process, control the torque of the generator to not decrease below a predetermined lower limit.

2. The vehicle according to claim 1, wherein
in the first process, the rate of variation in the accelerator operation amount is limited by gently varying the accelerator operation amount through filtering.

3. The vehicle according to claim 1, wherein
in the second process, the rate of variation in the vehicle required torque is limited by gently varying the vehicle required torque through filtering.

4. The vehicle according to claim 1, wherein
in the third process, the torque of the generator is limited such that the torque of the generator is not decreased to below a predetermined torque through guard process.

5. The vehicle according to claim 1, further comprising:
a transmission that is provided between the motor and the output shaft, wherein the controller is configured to change the limit value on the basis of a speed ratio of the transmission.

6. The vehicle according to claim 1, further comprising:
a planetary gear unit that includes: a ring gear coupled to the output shaft; a sun gear coupled to the generator; pinions engaged with the sun gear and the ring gear; and a carrier coupled to the engine and supporting the pinions such that the pinions are rotatable.

7. A vehicle that travels by rotating an output shaft coupled to a drive wheel using power of at least one of an engine and a motor, comprising:
a generator that generates electric power using power of the engine;
a battery that is configured to be connectable to the motor and the generator; and
a transmission that is provided between the motor and the output shaft, wherein the controller is configured to change the limit value on the basis of a speed ratio of the transmission; wherein
the transmission establishes any one of a low-speed gear and a high-speed gear that is smaller in speed ratio than the low-speed gear, and a controller that is configured to drive the motor in pulse width modulation control when a vehicle speed is lower than a threshold, and that is configured to drive the motor in rectangular control, which has an improved output but poor controllability as compared with the pulse width modulation, when the vehicle speed exceeds the threshold, wherein
at the time of an abnormality of the battery, the controller is configured to execute battery-less travel control in which the battery is isolated from the motor and the generator, the generator is caused to generate electric power by generating a torque, corresponding to at least any one of an accelerator operation amount and a vehicle required torque, from the generator, and the motor is driven by using the electric power generated by the generator, and
at the time of executing the battery-less travel control, when the vehicle speed exceeds a limit value corresponding to the threshold, the controller is configured to execute at least one of a first process of limiting a rate of variation in the accelerator operation amount, a second process of limiting a rate of variation in the vehicle required torque and a third process of limiting a torque of the generator to thereby suppress losing a balance of input and output electric powers between the generator and the motor; and
the controller is configured to increase the threshold and the limit value when the high-speed gear is established as compared with when the low-speed gear is established.

8. The vehicle according to claim 7, wherein
the controller is configured to, at the time of executing the battery-less travel control, shift into the high-speed gear when the low-speed gear is established.

9. A control method for a vehicle that travels by rotating an output shaft coupled to a drive wheel using power of at least one of an engine and a motor, wherein the vehicle includes: a generator that generates electric power using power of the engine; a battery that is configured to be connectable to the motor and the generator; and a controller that is configured to control the motor and the generator, the control method comprising:
driving the motor in pulse width modulation control when a vehicle speed is lower than a threshold;
driving the motor in rectangular control that has an improved output but poor controllability as compared with the pulse width modulation control when the vehicle speed exceeds the threshold;
determining an abnormality of the battery;
executing, if the battery is determined to be abnormal, a battery-less travel control in which the battery is isolated from the motor and the generator, the generator is caused to generate electric power by generating a torque, corresponding to at least any one of an accelerator operation amount and a vehicle required torque, from the generator, and the motor is driven by using the electric power generated by the generator;
determining, if the battery-less travel control is executed, if the vehicle speed exceeds the threshold; and
executing, if the vehicle speed is determined to exceed the threshold, at least one of a first process, a second process, and a third process to thereby suppress losing a balance of input and output electric powers between the generator and the motor, wherein the control method further comprises:
in the first process, limiting a rate of variation in the accelerator operation amount, in the second process, limiting rate of variation in the vehicle required torque, and in the third process, controlling the torque of the generator to not decrease below a predetermined lower limit.

* * * * *